United States Patent
Di Sarro et al.

(10) Patent No.: US 8,737,028 B2
(45) Date of Patent: May 27, 2014

(54) RC-TRIGGERED ESD CLAMP DEVICE WITH FEEDBACK FOR TIME CONSTANT ADJUSTMENT

(75) Inventors: James P. Di Sarro, Essex Junction, VT (US); Robert J. Gauthier, Jr., Hinesburg, VT (US); Tom C. Lee, Essex Junction, VT (US); Junjun Li, Williston, VT (US); Souvick Mitra, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 13/312,047

(22) Filed: Dec. 6, 2011

(65) Prior Publication Data

US 2013/0141823 A1    Jun. 6, 2013

(51) Int. Cl.
*H02H 9/04*    (2006.01)
*G06F 17/50*    (2006.01)

(52) U.S. Cl.
USPC ............................................. 361/56; 716/102

(58) Field of Classification Search
USPC .......................................................... 361/56
See application file for complete search history.

(56) References Cited

U.S. PATENT DOCUMENTS

| | | | |
|---|---|---|---|
| 6,965,503 B2 | 11/2005 | Connor et al. | |
| 7,102,862 B1* | 9/2006 | Lien et al. | 361/56 |
| 7,205,611 B2 | 4/2007 | Honjoh et al. | |
| 7,440,248 B2 | 10/2008 | Arai et al. | |
| 7,929,262 B1 | 4/2011 | Vashchenko et al. | |
| 2003/0076636 A1* | 4/2003 | Ker et al. | 361/56 |
| 2007/0171587 A1 | 7/2007 | Lee et al. | |
| 2009/0019595 A1 | 1/2009 | Dougherty | |
| 2010/0033164 A1 | 2/2010 | Ker et al. | |
| 2011/0043953 A1 | 2/2011 | Ker et al. | |
| 2012/0180008 A1* | 7/2012 | Gist et al. | 716/101 |

* cited by examiner

*Primary Examiner* — Jared Fureman
*Assistant Examiner* — Kevin J Comber
(74) *Attorney, Agent, or Firm* — Wood, Herron & Evans LLP; Anthony J. Canale

(57) ABSTRACT

Methods for responding to an electrostatic discharge (ESD) event on a voltage rail, ESD protection circuits, and design structures for an ESD protection circuit. An RC network of the ESD protection circuit includes a capacitor coupled to a field effect transistor at a node. The node of the RC network is coupled with an input of the inverter. The field-effect transistor is coupled with an output of the inverter. In response to an ESD event, a trigger signal is supplied from the RC network to the input of the inverter, which drives a clamp device to discharge current from the ESD event from the voltage rail. An RC time constant of the RC network is increased in response to the ESD event to sustain the discharge of the current by the clamp device.

18 Claims, 3 Drawing Sheets

RC-TRIGGERED ESD CLAMP DEVICE WITH FEEDBACK FOR TIME CONSTANT ADJUSTMENT

BACKGROUND

The present invention relates generally to semiconductor device fabrication and, more particularly, to methods responding to an electrostatic discharge (ESD) event on a voltage rail, as well as ESD protection circuits and design structures for an ESD protection circuit.

Modern electronics achieve high levels of functionality in small form factors by integrating multiple functions onto a single chip. A common fabrication process that allows high levels of integration at a relatively low cost is complementary metal-oxide-semiconductor (CMOS). CMOS processes build a combination of p-type and n-type metal-oxide-semiconductor field-effect transistors (MOSFETs) to implement logic gates and other types of digital circuits.

Chips may be exposed to ESD events leading to potentially large and damaging currents within the integrated circuit. Increasing integration densities and performance demands on CMOS chips have resulted in reduced device dimensions. The reduction in dimensions has increased the susceptibility of integrated circuits to ESD events. Manufacturers, assemblers, and users of integrated circuits must therefore take precautions to avoid unintentionally causing ESD events. For example, ESD prevention can be incorporated into the integrated circuit and may include special design techniques for input/output (I/O) pins and pads to prevent damage to the chip during handling from the time that the chip is manufactured until the time that the chip is installed on a circuit board.

Effective ESD protection for a power supply pad typically requires a circuit that provides a low impedance path to direct ESD currents away from the integrated circuit during the ESD event, but remains in a high impendence state when the integrated circuit is powered under non-ESD conditions. Circuits that include a clamp device, such as a semiconductor-controlled rectifier (SCR) or MOSFET are often used to provide this type of ESD protection in CMOS applications, but typically require a trigger circuit to function properly. The trigger circuit may include a resistor-capacitor (RC) circuit having a time constant sufficient to keep the clamp device triggered for the duration of an ESD event, but that prevents the clamp device from triggering undesirably during a normal power up sequence.

Therefore, improved methods responding to an electrostatic discharge (ESD) event on a voltage rail, as well as ESD protection circuits and design structures for an ESD protection circuit are needed.

SUMMARY

In one embodiment, a method is provided for responding to an electrostatic discharge (ESD) event on a voltage rail. The method includes providing a trigger signal from an RC network to an inverter in response to the ESD event, and driving a clamp device with the inverter to discharge current from the ESD event from the voltage rail through the clamp device. The method further includes increasing an RC time constant of the RC network in response to the ESD event to sustain the discharge of the current by the clamp device.

In another embodiment, an ESD protection circuit is provided that includes a drive circuit having an inverter with an input and an output coupled with a clamp device. The clamp device is configured to discharge current from the ESD event. The ESD protection circuit further includes an RC network with a capacitor coupled to a field-effect transistor at a node. The node of the RC network is coupled with the input of the inverter. The field-effect transistor is coupled with the output of the inverter.

In another embodiment of the invention, a hardware description language (HDL) design structure is encoded on a machine-readable data storage medium. The HDL design structure comprises elements that, when processed in a computer-aided design system, generates a machine-executable representation of an ESD protection circuit. The HDL design structure includes a drive circuit having an inverter with an input and an output coupled with a clamp device. The clamp device is configured to discharge current from the ESD event. The ESD protection circuit further includes an RC network with a capacitor coupled to a field-effect transistor at a node. The node of the RC network is coupled with the input of the inverter. The field-effect transistor is coupled with the output of the inverter. The HDL design structure may comprise a netlist. The HDL design structure may also reside on storage medium as a data format used for the exchange of layout data of integrated circuits. The HDL design structure may reside in a programmable gate array.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Embodiments of the invention are generally related to an electrostatic discharge (ESD) protection circuit for an input/output (I/O) power pad of an integrated circuit, or chip, as well as methods for providing ESD protection and design structures for an ESD protection circuit. The ESD protection circuit includes a clamp device, such as a semiconductor-controlled rectifier (SCR), coupled to a trigger circuit. The trigger circuit may include an inverter with an input coupled to a first power supply pad by a field-effect transistor and to a second power supply pad by a capacitor. The field-effect transistor may operate in a linear or ohmic mode so that the field-effect transistor and capacitor together form an RC-network having a time constant that depends on the resistance of the field-effect transistor. The field-effect transistor may include a gate coupled to the output of the inverter that provides feedback in the form of a feedback signal from the output of the inverter to the RC-circuit. This feedback mechanism may cause the resistance of the field-effect transistor to vary with the output voltage of the inverter.

In the absence of an ESD event while the chip is unpowered (whether the chip is loose or is installed (e.g., surface mounted) on a printed circuit board), the field-effect transistor may be biased so that the capacitor is coupled to the second power pad by a relatively low resistance. This low resistance contributes to a relatively short time constant for the RC-network, so that the voltage at the input of the inverter closely tracks the voltage of the second power pad under non-ESD conditions.

In contrast, the occurrence of an ESD event at the first power pad may cause the output of the inverter to rise abruptly. This abrupt rise in the output of the inverter may cause the trigger circuit to trigger the clamp device, thereby shunting current away from the first power pad through the clamp device and reducing the flow of ESD current through sensitive areas of the integrated circuit. The voltage on the output of the inverter may also bias the field-effect transistor so that the resistance of the transistor is increased. The resulting increase in the RC time constant may prolong the duration of the trigger signal generated by the trigger circuit so that the clamp device remains triggered for the duration of the ESD event. The feedback provided by coupling the output of the inverter to the field-effect transistor may thereby improve the ESD response of the protection circuit. The feedback may also allow the use of a smaller capacitor, which may reduce the chip area occupied by the RC-network as compared with similar RC-networks for trigger circuits lacking this feedback feature.

Figure 1:
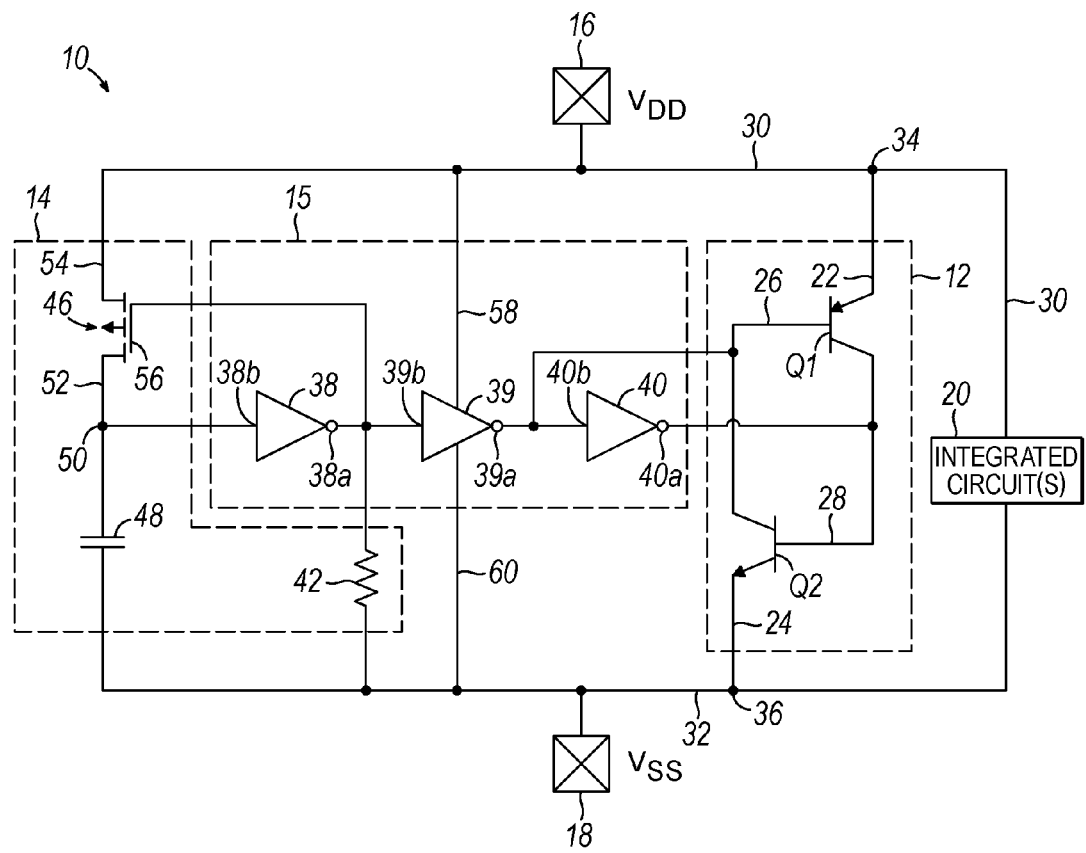
FIG. 1 is a diagrammatic view illustrating the electrical configuration of an ESD protection circuit used to provide protection against positive voltage ESD pulses directed to an I/O power pad.

With reference to FIG. 1 and in accordance with an embodiment of the invention, an ESD protection circuit 10 for one or more protected integrated circuits 20 includes a clamp device in the representative form of an SCR 12, a filter network or RC network 14, and a drive circuit 15. In an alternative embodiment, the clamp device may be an MOSFET-based power clamp instead of SCR 12.

The SCR 12 may be comprised of adjacent regions of alternating n-type and p-type semiconductor material arranged to form a PNPN structure having p-n junctions between the adjacent regions. The adjacent regions may be vertically arranged in a stack, horizontally arranged in a plane, or the PNPN structure may include combinations of vertically and horizontally arranged semiconductor regions. By way of a specific example, the SCR 12 may include a first n-well and a first p-well formed in the active region of a bulk semiconductor or semiconductor-on-insulator (SOI) substrate. The first n-well and the first p-well may be laterally adjacent so that they share a vertical boundary forming a butted p-n junction. The SCR 12 may include a second p-well located within the first n-well to define an anode 22. The second p-well may be a p$^+$ contact region within the first n-well, and may thereby form a p-n junction at the boundary shared with the first n-well. Similarly, the SCR 12 may include a second n-well located within the first p-well to define a cathode 24. The second n-well may be an n$^+$ contact region within the first p-well. The second n-well may thereby form a p-n junction at the boundary shared with the first p-well.

A PNP bipolar transistor Q1 may be formed by three adjacent regions of the PNPN structure. An emitter region of the transistor Q1 may be comprised of the anode 22 of SCR 12. A base region of the transistor Q1 may be comprised of an n-trigger gate 26 defined by the first n-well of SCR 12. A collector region of the transistor Q1 may be comprised of the first p-well of SCR 12.

An NPN bipolar transistor Q2 may be formed by three adjacent regions of the PNPN structure. A base region of transistor Q2 shares the same p-region of SCR 12 as the collector of transistor Q1 and forms a p-trigger gate 28 of SCR 12. A collector region of transistor Q2 shares the same n-well of SCR 12 with the base of transistor Q1. An emitter region of transistor Q2 may be defined by the cathode 24 of SCR 12.

The SCR 12 may be used to provide ESD protection to sensitive devices of integrated circuits 20 on the chip, which are coupled to the positive voltage power pad 16 by positive voltage rail 30 and coupled to the negative voltage power pad 18 by a negative voltage rail 32. The anode 22 of SCR 12 may be coupled to the positive voltage rail 30 at a positive voltage node 34 and the cathode 24 of SCR 12 may be coupled to the negative voltage rail 32 at a negative voltage node 36. An ESD path for positive voltage ESD pulses is thereby defined through the transistors Q1, Q2 from the positive voltage power pad 16 to the negative voltage power pad 18.

Under normal operating conditions, the SCR 12 presents a high impedance between the positive and negative voltage nodes 34, 36, so that the voltages on the voltage rails 30, 32 are relatively unaffected by the coupling of SCR 12. In response to an ESD event, the SCR 12 may enter into a low impedance state to provide a current path between the voltage rails 30, 32. The ESD current is thereby shunted by the SCR 12 from the positive voltage rail 30, which provides power to integrated circuits 20 under normal operating conditions, to the negative voltage rail 32. The SCR 12 may thereby prevent ESD voltages from damaging the integrated circuits 20.

The RC network 14 includes a field-effect transistor 46 that operates as a first resistive element, discharge resistor 42 that operates as a second resistive element, and a capacitor 48 that operates as a capacitive element. The field-effect transistor 46 and the capacitor 48 are connected in series between the voltage rails 30, 32. An input node 50 is positioned between the field-effect transistor 46 and the capacitor 48.

The field-effect transistor 46 may be a p-channel metal oxide semiconductor field-effect transistor (p-channel MOSFET or PFET) with a drain 52 coupled to the capacitor 48 at the input node 50, a source 54 coupled to the positive voltage power pad 16, and a gate 56 coupled to the output 38a of inverter 38. The drain 52 and source 54 of the field-effect transistor 46 may be separated by a channel of semiconductor material that is electrostatically coupled to the gate 56 by an insulating layer. Voltages appearing on the gate 56 may thereby affect the conductivity of the channel by either reducing or enhancing the number of charge carriers. For example, a positive gate-to-source voltage ($V_{GS}$) may reduce the number of positive charge carriers in the channel of the field-effect transistor 46. The resistance between the drain 52 and source 54 of field-effect transistor 46 as modulated by changes in conductivity cooperates with the capacitance of capacitor 48 to provide an RC time constant. This RC time constant may cause the voltage at input node 50 to lag changes in the voltage on the positive voltage rail 30 relative to the negative voltage rail 32. The capacitor 48 may be a metal-insulator-metal (MIM) capacitor, a varactor, a MOS capacitor, or another type of capacitor structure and couples the drain 52 of the field-effect transistor 46 with the negative voltage power pad 18.

The drive circuit 15 includes a plurality of inverters 38, 39, 40 each comprised of a PFET and an n-channel MOSFET (NFET) in a paired arrangement. A drain of the PFET in each of the inverters 38, 39, 40 may be coupled with a drain of the corresponding NFET to form respective outputs 38a, 39a, 40a of the inverters 38, 39, 40. A gate of the PFET in each of the inverters 38, 39, 40 may be coupled with a gate of the corresponding NFET to form respective inputs 38b, 39b, 40b of the inverters 38, 39, 40. The sources of the PFETs may be coupled to the positive voltage power pad 16 by a positive voltage supply line 58. The sources of the NFETs may be coupled to the negative voltage power pad 18 by a negative voltage supply line 60. The inverters 38, 39, 40 may thereby be supplied with power whenever a sufficient voltage difference exists between the positive voltage rail 30 and the negative voltage rail 32.

The input 38b of inverter 38 may be coupled to the input node 50 so that changes in the voltage at the input 38b are delayed with respect to changes in the voltage at the positive voltage power pad 16 by an amount of time related to the time constant of the RC network 14. The inverters 38, 39, 40 are connected in series, with the output 39a of inverter 39 coupled to the n-trigger gate 26, and the output 40a of inverter 40 coupled to the p-trigger gate 28 so that the inverters 39, 40 may provide trigger signals to the SCR 12.

The discharge resistor 42 couples the output 38a of inverter 38 to the negative voltage rail 32. The discharge resistor 42 may provide a path to the negative voltage rail 32 that maintains the output 38a of inverter 38 at ground in the absence of an ESD event. The discharge resistor 42 may be a diffusion resistor comprised of a lightly-doped n-type diffusion or a lightly-doped p-type diffusion in the substrate, or may be a polysilicon resistor comprised of an undoped polysilicon layer.

The discharge resistor 42 may work cooperatively with gate-to-source and gate-to-body capacitances of the PFET and NFET of inverter 39 and source-to-body and drain-to-body capacitances of the PFET and NFET of inverter 38 to form a second RC circuit within RC network 14. This second RC circuit may couple the output 38a of inverter 38 with the positive voltage power pad 16 and the negative voltage power pad 18. The response of the second RC circuit to changes in the voltages on the power pads 16, 18 may be adjusted by selecting the value of the discharge resistor 42. The resistance value of the discharge resistor 42 may thus represent a design parameter for use in adjusting the response of the RC network 14 to changing voltages on the voltage rails 30, 32. To this end, the resistance value may be set so that the amount of feedback supplied to the field-effect transistor 46 from the output of inverter 38 is adjusted to a desired level. The discharge resistor 42 may thereby reduce the risk of triggering the SCR 12 in response to a power up of the chip while maintaining the sensitivity of the ESD protection circuit 10 to the occurrence of an ESD event.

Although illustrated in a double-triggered SCR configuration in FIG. 1, the SCR 12 may also be configured as a single-triggered SCR, in which case only one of either the n-trigger gate 26 or the p-trigger gate 28 would be coupled to its respective inverter signal output. In an alternative embodiment, a MOSFET-based power clamp (not shown) may be substituted for, or used in parallel with, SCR 12. In embodiments including a MOSFET-based power clamp, a gate of the MOSFET-based power clamp may be coupled to the output of an appropriate inverter as is understood by one having ordinary skill in the art.

The SCR 12, RC network 14, drive circuit 15, and integrated circuits 20 may be fabricated as part of a CMOS or BiCMOS chip. As understood by a person having ordinary skill in the art of semiconductor fabrication, standard CMOS or BiCMOS fabrication processes may be employed using a suitable substrate, such as a bulk semiconductor substrate or a device layer of an SOI substrate. For example, the SCR 12 may be formed by masking, implanting dopants of suitable impurity species with suitable kinetic energies, and thermally activating the implanted dopants. It is further understood that there are numerous ways of forming SCR devices and the embodiments of the invention are not limited to any specific SCR structure or method of fabricating the SCR 12.

Likewise, the inverters 38, 39, 40 and the field-effect transistor 46 may be defined in active regions formed in a substrate by masking, implanting dopants of suitable impurity species with suitable kinetic energies, and thermally activating the implanted dopants. A gate and a gate dielectric may be formed by depositing a gate stack using known methods and patterning the gate stack using photolithography and reactive ion etching (RIE). The drain and source for each field-effect transistor may be formed by implanting a suitable n-type dopant such as P, As, Sb, or may be formed by implanting a suitable p-type dopant such as B, Al, Ga depending on the type of device being formed. The dopants may be introduced by ion implantation using the gate as a self-aligning mask and separate resist masks during n-type and p-type dopant implantations and activated by an annealing step. In an embodiment of the invention, the field-effect transistor 46, as well as the devices comprising the inverters 38, 39, 40, may be MOSFET devices fabricated using methods well known to a person having ordinary skill in the art of semiconductor fabrication.

Standard back-end-of-line (BEOL) processing may follow the formation of the ESD protection circuit 10 to form a BEOL interconnect structure. Each level of the BEOL interconnect structure may be fabricated by damascene processes, such as a dual damascene process in which a dielectric layer is deposited, vias and trenches are etched in the dielectric layer, and the vias and trenches are filled with a conductor using a single blanket deposition followed by planarization. The damascene process may be replicated to stack multiple wiring levels so that a multi-level, high density framework of conductive interconnections is formed. Damascene processes and materials used in damascene processes are understood by a person having ordinary skill in the art. The metallization may define a wiring path forming the voltage rails 30, 32 and coupling the power pads 16, 18 with the local interconnect wiring of SCR 12, RC network 14, and integrated circuits 20.

The power pads 16, 18 may be fabricated using BEOL processes, such as layer deposition, photolithography and subtractive etching. For example, the power pads 16, 18 may be fabricated by depositing a layer stack including a top layer of aluminum (Al), copper (Cu), or an alloy (e.g., AlCu) onto the topmost level of the interconnect wiring and shaping the layer stack with one or more photolithography and etching processes. To facilitate connections between the chip and external components such as a circuit board, the power pads 16, 18 may be coupled to external power pins (not shown), which may be part of a chip package.

In operation, the positive voltage power pad 16 may be coupled to a positive chip supply voltage, such as $V_{DD}$, and the negative voltage power pad 18 may be coupled to a negative chip supply voltage, such as ground or $V_{SS}$. When the voltage rails 30, 32 are initially powered, the $V_{GS}$ of field-effect transistor 46 may be near zero since any charges on the device will typically bleed off over time when the chip is unpowered. The field-effect transistor 46 may enter a low impedance state when $V_{GS}$ is less than or equal to the threshold voltage ($V_T$) of field-effect transistor 46, which may be negative for an enhancement mode PFET. During a normal power up sequence, the voltage on the gate 56 of field-effect transistor 46 may be maintained near that of the negative voltage rail 32 by the discharge resistor 42. The field-effect transistor 46 may therefore enter the low impedance state when the voltage difference between the voltage rails 30, 32 reaches $V_T$. While in this low impedance state, the impedance of field-effect transistor 46 may dominate the response of the RC network 14. Thus, the voltage at the input node 50 may track the voltage on the positive voltage rail 30 beginning from the time at which the difference between the voltage rails 30, 32 exceeds $V_T$. The voltage at the input node 50 may thereby essentially track the voltage on positive voltage rail 30 for voltages having rise times characteristic of a normal application of power to the chip.

Shortly after power is applied to the chip, the capacitor 48 may become sufficiently charged so that the input 38b of inverter 38 is at or above a voltage level representing a logic high signal. In response, the output 38a of inverter 38 may drive the input 39b of inverter 39 low, causing the output 39a of inverter 39 to apply a logic level high voltage to the n-trigger gate 26. The n-trigger gate 26 may thus be provided with a voltage at or slightly below $V_{DD}$, depending on the voltage drops within the inverter 39. The base of transistor Q1 may thereby have a voltage at or slightly below the voltage applied to the positive voltage power pad 16. The resulting low base-emitter voltage of transistor Q1 may maintain transistor Q1 in an off state.

The output 39a of the inverter 39 may also drive the input 40b of inverter 40 to a logic high state, so that the output 40a of inverter 40 applies a logic level low voltage to the p-trigger gate 28. The base of transistor Q2 may thereby be provided with a voltage at or slightly above $V_{SS}$. Transistor Q2 may thereby be placed in an off state so the voltage on n-trigger gate 26 is not pulled down by transistor Q2, which maintains SCR 12 in a high impedance or non-conductive state. The RC network 14 and drive circuit 15 may thereby maintain the SCR 12 in the high impedance state when the chip is powered so that significant current is not shunted through the SCR 12.

In an unpowered state, such as when the chip is not installed on a printed circuit board, or when the chip is installed on a printed circuit board that is not powered, the voltages on power pads 16, 18 and voltage rails 30, 32 may be nominally zero, since any voltages previously applied to the chip tend to bleed off over time. The capacitor 48 may initially be fully discharged with respect to the positive voltage power pad 16 by the field-effect transistor 46, so that the input 38b of inverter 38 is at zero volts relative to both voltage rails 30, 32.

When an ESD current pulse occurs on the positive voltage rail 30, the inverters 38, 39, 40 may be powered by the positive voltage associated with the ESD event. For a relatively slow voltage rise time (such as is typically associated with a normal chip power up sequence), the discharge resistor 42 may dominate the response of the second RC circuit. The output 38a of inverter 38 thus typically remains near the voltage on the negative voltage power pad 18 during a normal chip power up sequence. In contrast, a fast voltage rise time (such as is typically associated with an ESD event) may result in the parasitic capacitances of the FETs comprising inverters 38, 39 dominating the response of the second RC circuit. As a result, a significant amount of the ESD voltage pulse may be capacitively coupled to the output 38a of inverter 38 during an ESD event.

This capacitively coupled pulse may cause the output 38a of inverter 38 to abruptly rise to a voltage that is approximately half that of the positive ESD pulse. This positive voltage on the output 38a of inverter 38 may provide a positive voltage bias to the gate 56 of field-effect transistor 46. The positive voltage gate bias may in turn increase the resistance of the field-effect transistor 46 by applying an electric field that changes the conductivity of the channel. The resulting increase in the resistance between the drain 52 and source 54 of field-effect transistor 46 may function to increase the time constant of the RC network 14. As a result, the voltage at input node 50 may lag the voltage on the positive voltage rail 30 by a larger amount than during the power up conditions discussed above. The increased RC time constant of the RC network 14 may thereby prevent the voltage at the input of the inverter 38 from rising as quickly as during power up.

Coupling the output 38a of inverter 38 to the gate 56 of field-effect transistor 46 may provide a feedback signal that increases the resistance of the field-effect transistor 46 during the ESD event. The increased resistance of the field-effect transistor 46 effectively lengthens the time constant of the RC network 14 and increases the duration of the trigger signal in comparison with trigger circuits that lack feedback between the inverters 38, 39, 40 and the RC network 14.

The resistive value of discharge resistor 42 may affect the amplitude, rise time, and duration of voltages coupled to the output 38a of inverter 38 by the second RC circuit. The sensitivity of the RC network 14 and resulting rise time of the trigger signal in response to the ESD pulse voltage may thus be selected by changing the value of discharge resistor 42. The discharge resistor 42 may thereby be used to control the amount of feedback provided to the field-effect transistor 46 and provide an additional tuning mechanism for adjusting the response of the RC network 14 to the ESD event.

Because the capacitor 48 may be at zero volts at the beginning of the ESD event, the input 38b of inverter 38 may initially be at a low voltage level relative to the negative voltage supply line 60. This may cause the inverter 38 to output a signal in the form of a high logic level voltage, which in turn may cause the signal outputs of inverters 39, 40 to output low and high logic levels, respectively. The output 39a of inverter 39 may thus drive the voltage of the n-trigger gate 26 below the voltage of the anode 22 of SCR 12. The resulting forward bias on the emitter-base junction of transistor Q1 may cause the transistor Q1 to enter a low impedance state. The transistor Q1 may thereby shunt the ESD current from the positive voltage power pad 16 to the p-trigger gate 28 (i.e., base of transistor Q2). The shunted ESD current may thereby work cooperatively with the logic high output voltage of inverter 40 to switch the transistor Q2 into a low impedance state by similarly forward biasing the base-emitter junction of transistor Q2. The resulting low impedance state of the SCR 12 electrically couples the positive voltage rail 30 to the negative voltage rail 32 through the SCR 12, which discharges the ESD pulse to the negative voltage rail 32.

Because either one of the SCR triggering signals supplied by inverters 39, 40 individually may be sufficient to trigger the SCR 12 into a low impedance state, alternative embodiments may rely on triggering the SCR 12 by applying a trigger voltage to the n-trigger gate 26 only, or by applying a trigger voltage to the p-trigger gate 28 only.

Once triggered, the SCR 12 may remain in the low impedance state until the triggering signals time out or until the shunted ESD current drops below a threshold known as the holding current. The SCR 12 may thereby be maintained in a low impedance state until the ESD pulse has dissipated by keeping the RC network 14 active for the duration of the ESD event. In other words, the increased RC time constant of the RC network 14 sustains the discharge of the current from the ESD event through the clamp device represented by the SCR 12.

The time constant of a conventional RC network for triggering an ESD protection circuit may be established at the fabrication stage by the parameters of the resistive and capacitive components. The conventional RC network thus has a fixed time constant that is a compromise between a time constant sufficiently long to provide trigger signals that last for the expected duration of an ESD event, but short enough to prevent the trigger circuit from falsely triggering when power is applied to the chip. For example, the RC time constant of a conventional RC network may typically be set in a range of 100 nanoseconds to 150 nanoseconds.

The ESD protection circuit 10 functions as an RC-triggered ESD clamp capable of extended clamp-on times. Because the time constant of the RC network 14 is modulated by the feedback signal from the output 38a of inverter 38 to the field-effect transistor 46, the time constant of the RC network 14 may be substantially lengthened in response to an ESD event as compared the time constant provided during a normal application of power to the chip. Thus, the feedback feature may allow the RC network 14 to have a relatively short (e.g., 5 nanoseconds) time constant in an unpowered state under non-ESD conditions and also provide SCR 12 with a continuing trigger signal lasting for the full duration of an ESD event (e.g., ≥100 nanoseconds). The RC network 14 may thereby provide trigger signals that maintain the ESD protection circuit 10 in a low-impedance state for the duration of expected ESD events with less false triggering during normal power-up sequences than ESD protection circuits lacking the feedback feature.

The use of feedback in modulating the time constant of RC network 14 may also create a sharp transition between triggered and non-triggered states in the ESD protection circuit 10, which improves the response time of the circuit 10 to ESD events. Moreover, the ability to implement trigger circuits with reduced RC-time constants may also allow the use of a smaller capacitor 48 and/or discharge resistor 42, thereby reducing the amount of chip area required by the RC network 14 as compared to RC networks lacking the feedback feature.

Figure 2:
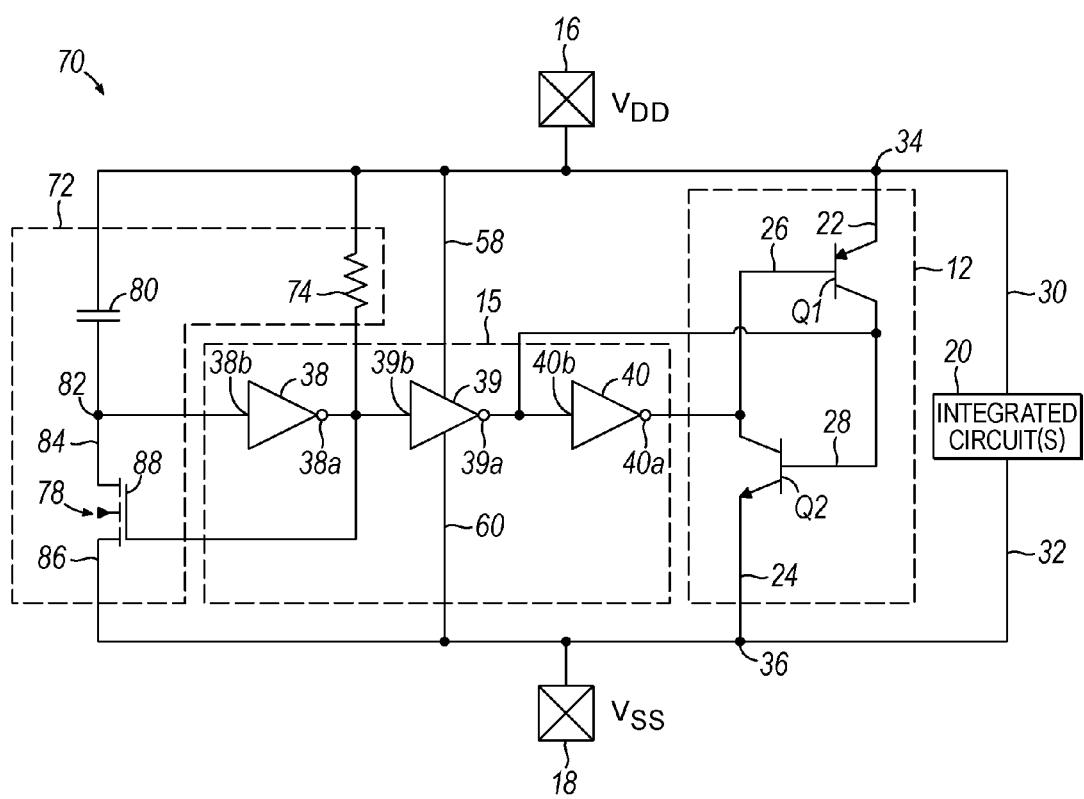
FIG. 2 is a diagrammatic view illustrating an alternative electrical configuration of an ESD protection circuit used to provide protection against positive voltage ESD pulses directed to an I/O power pad.

With reference to FIG. 2 in which like reference numerals refer to like features in FIG. 1 and in accordance with an alternative embodiment of the invention, an ESD protection circuit 70 may include an RC network 72 instead of RC network 14. Similarly to RC network 14, RC network 72 includes a field-effect transistor 78 that operates as a first resistive element, a discharge resistor 74 that operates as a second resistive element, and a capacitor 80 that operates as a capacitive element. The field-effect transistor 78 and capacitor 80 are connected in series between the voltage rails 30, 32, but with the relative positions of the field-effect transistor 78 and capacitor 80 reversed as compared to RC network 14. A input node 82 is positioned between the field-effect transistor 78 and capacitor 80.

The field-effect transistor 78 may be an NFET with a drain 84 coupled to the capacitor 80 at an input node 82, a source 86 coupled to the negative voltage power pad 18, and a gate 88 coupled to the output 38a of inverter 38. Similarly as with the PFET represented by field-effect transistor 46, voltages appearing on the gate 88 of field-effect transistor 78 may affect the conductivity of the channel by either reducing or enhancing the number of charge carriers. For example, a negative $V_{GS}$ may reduce the number of negative charge carriers in the channel of field-effect transistor 78. The resistance between the drain 84 and source 86 of field-effect transistor 78 as modulated by changes in conductivity may cooperate with the capacitance of capacitor 80 to provide an RC time constant. This RC time constant may cause the voltage at input node 82 to lag changes in the voltage on negative voltage rail 32 relative to changes in the voltage on positive voltage rail 30. The RC network 72 thus operates similarly as the RC network 14, but in an essentially reverse manner with respect to how the input node 82 reacts to changes in the voltages on the positive voltage rail 30 and the negative voltage rail 32.

The input 38b of inverter 38 may be coupled to the input node 82. Changes in the voltage at the input 38b may thus be delayed with respect to changes in the voltage at the negative voltage power pad 18, but may tend to track rapid changes in the voltage at the positive voltage power pad 16. The delay between the voltage at the input node 82 and the voltage at negative voltage power pad 18 may be related to the time constant of the RC network 72 so that changes in the time constant affect the delay. The output 39a of inverter 39 may be coupled to the p-trigger gate 28, and the output 40a of inverter 40 coupled to the n-trigger gate 26 so that the inverters 39, 40 may provide trigger signals to the SCR 12 in a similar manner as described with respect to the ESD protection circuit 10 (FIG. 1).

The discharge resistor 74 couples the output 38a of inverter 38 to the positive voltage rail 30. The discharge resistor 74 may provide a path to the positive voltage rail 30 that maintains the output 38a of inverter 38 at zero volts relative to the positive voltage rail in the absence of an ESD event. As with discharge resistor 42, the discharge resistor 74 may be a diffusion resistor comprised of a lightly-doped n-type diffusion or a lightly-doped p-type diffusion in the substrate, or may be a polysilicon resistor comprised of an undoped polysilicon layer.

The RC network 72 is thus configured so that the input node 82 tracks the negative voltage rail 32 for slow changes in rail voltage, such as experienced during a normal power up sequence, and tracks the positive voltage rail 30 for rapid changes in rail voltage, such as produced by an ESD event. ESD protection circuit 70 thus operates similarly to ESD protection circuit 10, except that RC network 72 is essentially reversed with respect to the voltage rails 30, 32. This configuration may allow the RC network 72 to function in a desired manner with the operating parameters of the NFET representing field-effect transistor 78.

In operation, the positive voltage power pad 16 may be coupled to $V_{DD}$ and the negative voltage power pad 18 may be coupled to ground or $V_{SS}$. Similarly as with RC network 14, the field-effect transistor 78 may enter a low impedance state when the $V_{GS}$ of field-effect transistor 78 is greater than or equal to the $V_T$ of field-effect transistor 78, which may be positive for an enhancement mode NFET. During a normal power up sequence, the voltage on the gate 88 of field-effect transistor 78 may be maintained near that of the positive voltage rail 30 by the discharge resistor 74. The field-effect transistor 78 may therefore enter the low impedance state when the voltage difference between the voltage rails 30, 32 reaches $V_T$ so that the field-effect transistor 78 begins to dominate the response of the RC network 72. Thus, the voltage at the input node 82 may track the voltage on the negative voltage rail 32 beginning from the time at which the difference between the voltage rails 30, 32 exceeds the $V_T$ of field-effect transistor 78. The voltage at the input node 82 may thereby essentially track the voltage on negative voltage rail 32 for voltages having rise times characteristic of a normal application of power to the chip.

Shortly after power is applied to the chip, the voltage on the positive voltage supply line 58 of the inverters 38, 39, 40 may rise sufficiently so that the relative voltage on input 38b of inverter 38 is at or below a voltage level representing a logic low signal. In response, the output 38a of inverter 38 may drive the input 39b of inverter 39 high, causing the output 39a of inverter 39 to apply a logic level low voltage to the p-trigger gate 28 of SCR 12. As a result, the voltage on p-trigger gate 28 may be at or slightly above $V_{SS}$, so that the base of transistor Q2 has a voltage at or slightly above the voltage applied to the negative voltage power pad 18. The resulting low base-emitter voltage of transistor Q2 may maintain transistor Q2 in an off state. The output 39a of the inverter 39 may also drive the input 40b of inverter 40 to a logic low state. In response, the output 40a of inverter 40 may apply a logic level high voltage to the n-trigger gate 26 of SCR 12. The base of transistor Q1 may thereby be provided with a voltage at or slightly below $V_{DD}$ so that transistor Q1 is also in an off state. The RC network 72 and drive circuit 15 may thereby maintain the SCR 12 in the high impedance state when the chip is powered so that significant current is not shunted through the SCR 12.

As described with respect to ESD protection circuit 10, while in an unpowered state, a positive ESD pulse may appear on the positive voltage rail 30. This ESD pulse may be coupled to the output of inverter 38 by a second RC circuit formed by the discharge resistor 74 and the parasitic capacitances of the FETs comprising inverter 38 and inverter 39. However, in contrast to the RC network 14 (FIG. 1), the capacitor 80 may cause the voltage at the input node 82 to initially track the voltage of the positive voltage rail 30 rather than the voltage of the negative voltage rail 32. The voltage at the input node 82 may thus initially be about equal to that of the ESD pulse so that the input 38b of inverter 38 is at or above a voltage level representing a logic high signal. In response, the output 38a of inverter 38 may drive the gate 88 of field-effect transistor 78 to a logic level low voltage at or slightly above that of negative voltage rail 32. The logic low level on the gate 88 of field-effect transistor 78 may thereby cause the $V_{GS}$ of field-effect transistor 78 to be near zero. This low $V_{GS}$ may be less than the $V_T$ of field-effect transistor 78, so that the field-effect transistor 78 is placed in a high impedance state. The resulting increase in the time constant of the RC network 72 may cause the voltage at input node 82 to lag the voltage on the negative voltage rail 32 by a larger amount than during the normal power up sequence discussed above. The increased RC time constant of the RC network 72 may thereby reduce the tracking between the voltage at the input 38b of inverter 38 and the voltage of negative voltage rail 32 during the ESD event.

Coupling the output 38a of inverter 38 to the gate 88 of field-effect transistor 78 may thereby provide a feedback signal that modulates the drain-to-source resistance of the field-effect transistor 78 during the ESD event. As with RC network 14, this feedback signal may increase the duration of the trigger signal as compared to trigger circuits that lack feedback between the inverters 38, 39, 40 and RC network 72. Moreover, this feedback signal may be further controlled by the resistive value of discharge resistor 74 similarly as described with respect to RC network 14. The RC network 72 thus operates in a similar manner as RC network 14 with regard to modulation of the RC time constant formed by the field-effect transistor 78 and capacitor 80.

The logic level low output voltage of inverter 38 may cause the signal outputs of inverters 39, 40 to output high and low logic levels, respectively, during the ESD event. The output 40a of inverter 40 may thus drive the voltage of the n-trigger gate 26 below the voltage of the anode 22 of SCR 12, forward biasing the emitter-base junction of transistor Q1 so that Q1 enters a low impedance state. Likewise, the logic high output voltage of inverter 39 may drive the p-trigger gate 28 above the voltage of the cathode 24 of SCR 12, forward biasing the emitter-base junction of transistor Q2 so that transistor Q2 likewise enters a low impedance state. The resulting low impedance state of the SCR 12 electrically couples the positive voltage power pad 16 to negative voltage power pad 18 through the SCR 12. The SCR 12 in ESD protection circuit 70 may thereby discharge the ESD pulse to the negative voltage power pad 18 in essentially the same manner as described with respect to ESD protection circuit 10.

Figure 3:
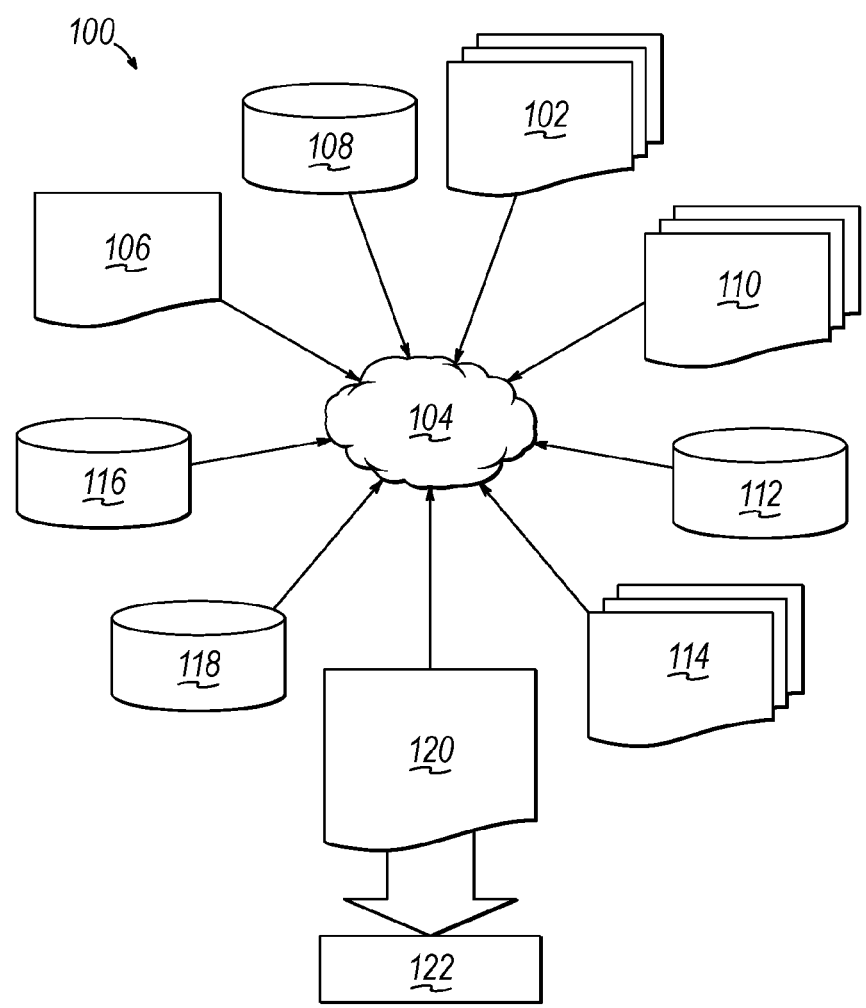
FIG. 3 is a flow diagram of a design process used in semiconductor design, manufacture, and/or test.

FIG. 3 shows a block diagram of an exemplary design flow 100 used for example, in semiconductor IC logic design, simulation, test, layout, and manufacture. Design flow 100 includes processes, machines and/or mechanisms for processing design structures or devices to generate logically or otherwise functionally equivalent representations of the design structures and/or devices described above and shown in FIGS. 1 and 2. The design structures processed and/or generated by design flow 100 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 100 may vary depending on the type of representation being designed. For example, a design flow 100 for building an application specific IC (ASIC) may differ from a design flow 100 for designing a standard component or from a design flow 100 for instantiating the design into a programmable array, for example a programmable gate array (PGA) or a field programmable gate array (FPGA) offered by Altera® Inc. or Xilinx® Inc.

FIG. 3 illustrates multiple such design structures including an input design structure 102 that is preferably processed by a design process 104. Design structure 102 may be a logical simulation design structure generated and processed by design process 104 to produce a logically equivalent functional representation of a hardware device. Design structure 102 may also or alternatively comprise data and/or program instructions that when processed by design process 104, generate a functional representation of the physical structure of a hardware device. Whether representing functional and/or structural design features, design structure 102 may be generated using electronic computer-aided design (ECAD) such as implemented by a core developer/designer. When encoded on a machine-readable data transmission, gate array, or storage medium, design structure 102 may be accessed and processed by one or more hardware and/or software modules within design process 104 to simulate or otherwise functionally represent an electronic component, circuit, electronic or logic module, apparatus, device, or system such as those shown in FIGS. 1 and 2. As such, design structure 102 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 104 preferably employs and incorporates hardware and/or software modules for synthesizing, translating, or otherwise processing a design/simulation functional equivalent of the components, circuits, devices, or logic structures shown in FIGS. 1 and 2 to generate a Netlist 106 which may contain design structures such as design structure 102. Netlist 106 may comprise, for example, compiled or otherwise processed data structures representing a list of wires, discrete components, logic gates, control circuits, I/O devices, models, etc. that describes the connections to other elements and circuits in an integrated circuit design. Netlist 106 may be synthesized using an iterative process in which netlist 106 is resynthesized one or more times depending on design specifications and parameters for the device. As with other design structure types described herein, netlist 106 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 104 may include hardware and software modules for processing a variety of input data structure types including Netlist 106. Such data structure types may reside, for example, within library elements 108 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 110, characterization data 112, verification data 114, design rules 116, and test data files 118 which may include input test patterns, output test results, and other testing information. Design process 104 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 104 without deviating from the scope and spirit of the invention. Design process 104 may also include modules for performing standard circuit design processes such as timing analysis, verification, design rule checking, place and route operations, etc.

Design process 104 employs and incorporates logic and physical design tools such as HDL compilers and simulation model build tools to process design structure 102 together with some or all of the depicted supporting data structures along with any additional mechanical design or data (if applicable), to generate a second design structure 120. Design structure 120 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 102, design structure 120 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1 and 2. In one embodiment, design structure 120 may comprise a compiled, executable HDL simulation model that functionally simulates the devices shown in FIGS. 1 and 2.

Design structure 120 may also employ a data format used for the exchange of layout data of integrated circuits and/or symbolic data format (e.g. information stored in a GDSII (GDS2), GL1, OASIS, map files, or any other suitable format for storing such design data structures). Design structure 120 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1 and 2. Design structure 120 may then proceed to a stage 122 where, for example, design structure 120: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The term "vertical" refers to a direction perpendicular to the horizontal, as just defined. The term "lateral" refers to a dimension within the horizontal plane.

It will be understood that when an element is described as being "connected" or "coupled" to or with another element, it can be directly connected or coupled with the other element or, instead, one or more intervening elements may be present. In contrast, when an element is described as being "directly connected" or "directly coupled" to another element, there are no intervening elements present. When an element is described as being "indirectly connected" or "indirectly coupled" to another element, there is at least one intervening element present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of responding to an electrostatic discharge (ESD) event, the method comprising:
   in response to the ESD event on a first voltage rail, generating a trigger signal with an RC network having a time constant equal to a product of a resistance of a field-effect transistor and a capacitance of a capacitor coupled in series with the field effect transistor between the first voltage rail and a second voltage rail;

providing the trigger signal from the RC network to an inverter;

driving a clamp device with the inverter to discharge current from the ESD event from the voltage rail through the clamp device; and after the trigger signal is provided from the RC network to the inverter, providing a feedback signal from an output of the inverter to a gate of the field-effect transistor to increase the resistance of the field-effect transistor such that the time constant of the RC network is increased to sustain the discharge of the current by the clamp device.

2. The method of claim 1 wherein the RC network includes a discharge resistor coupled to the output of the inverter, and the feedback signal is adjusted by the discharge resistor.

3. The method of claim 2 wherein the discharge resistor adjusts the feedback signal dependent on a resistance of the discharge resistor.

4. The method of claim 1 wherein the time constant of the RC network has a first value in the absence of an ESD event, and the time constant of the RC network has a second value during the ESD event, the second value being greater than the first value.

5. The method of claim 4 wherein the first value of the time constant ranges from 1 nanosecond to 5 nanoseconds, and the second value of the time constant is greater than or equal to 100 nanoseconds.

6. An electrostatic discharge (ESD) protection circuit comprising:

a drive circuit including a first inverter with an input and an output;

a clamp device coupled with the output of the first inverter, the clamp device configured to discharge current from an ESD event; and an RC network including a capacitor and a field-effect transistor coupled at a node, the node coupled with the input of the first inverter, the capacitor coupled in series with the field effect transistor between a first voltage rail and a second voltage rail, and the field-effect transistor including a gate coupled with the output of the first inverter, wherein the RC circuit has a time constant equal to a product of a capacitance of the capacitor and a resistance of the field-effect transistor.

7. The ESD protection circuit of claim 6 wherein the field-effect transistor includes a drain coupled to the capacitor at the node.

8. The ESD protection circuit of claim 6 wherein the RC network further includes a discharge resistor coupling the output of the first inverter to the second voltage rail.

9. The ESD protection circuit of claim 6 wherein the field-effect transistor has a first resistance in the absence of an ESD event and a second resistance during the ESD event.

10. The ESD protection circuit of claim 9 wherein the time constant ranges from 1 nanosecond to 5 nanoseconds in the absence of the ESD event, and the time constant is greater than or equal to 100 nanoseconds in response to the ESD event.

11. The ESD protection circuit of claim 6 wherein the field-effect transistor is a p-channel metal-oxide semiconductor field-effect transistor and includes a source coupled to the first voltage rail, and a drain coupled by the capacitor to a the second voltage rail.

12. The ESD protection circuit of claim 6 wherein the field-effect transistor is an n-channel metal-oxide semiconductor field-effect transistor and includes a source coupled to the first voltage rail, and a drain coupled by the capacitor to a the second voltage rail.

13. The ESD protection circuit of claim 6 wherein the drive circuit further comprises:

a second inverter having an input coupled to the output of the first inverter and an output; and a third inverter having an input coupled to the output of the second inverter and an output coupled with the clamp device.

14. The ESD protection circuit of claim 6 wherein the clamp device comprises a semiconductor-controlled rectifier with an anode coupled to the first voltage rail and a cathode coupled to the second voltage rail.

15. A hardware description language (HDL) design structure encoded on a machine-readable data storage medium, the HDL design structure comprising elements that when processed in a computer-aided design system generates a machine-executable representation of an electrostatic discharge (ESD) protection circuit, the HDL design structure comprising:

a drive circuit including an inverter with an input and an output;

a clamp device coupled with the output of the inverter, the clamp device configured to discharge current from an ESD event; and an RC network including a capacitor and a field-effect transistor coupled at a node, the node coupled with the input of the inverter, the capacitor coupled in series with the field effect transistor between a first voltage rail and a second voltage rail, and the field-effect transistor including a gate coupled with the output of the inverter, wherein the RC circuit has a time constant equal to a product of a capacitance of the capacitor and a resistance of the field-effect transistor.

16. The HDL design structure of claim 15 wherein the HDL design structure comprises a netlist.

17. The HDL design structure of claim 15 wherein the HDL design structure resides on storage medium as a data format used for the exchange of layout data of integrated circuits.

18. The HDL design structure of claim 15 wherein the HDL design structure resides in a programmable gate array.

* * * * *